United States Patent
Li et al.

(10) Patent No.: US 12,477,535 B2
(45) Date of Patent: Nov. 18, 2025

(54) METHOD FOR MAPPING PUSCH SIGNAL, TERMINAL, AND NETWORK-SIDE DEVICE

(71) Applicant: VIVO MOBILE COMMUNICATION CO., LTD., Guangdong (CN)

(72) Inventors: Na Li, Guangdong (CN); Gen Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 376 days.

(21) Appl. No.: 18/090,588

(22) Filed: Dec. 29, 2022

(65) Prior Publication Data
US 2023/0138775 A1    May 4, 2023

Related U.S. Application Data

(63) Continuation of application No. PCT/CN2021/104005, filed on Jul. 1, 2021.

(30) Foreign Application Priority Data

Jul. 2, 2020    (CN) .......................... 202010634269.0

(51) Int. Cl.
    *H04W 72/1268*    (2023.01)
    *H04L 5/00*    (2006.01)
    (Continued)

(52) U.S. Cl.
CPC ....... *H04W 72/1268* (2013.01); *H04L 5/0007* (2013.01); *H04L 5/0035* (2013.01); *H04W 72/232* (2023.01); *H04W 88/06* (2013.01)

(58) Field of Classification Search
CPC ........... H04W 72/1268; H04W 72/232; H04W 88/06; H04W 72/0453; H04W 72/21;
(Continued)

(56) References Cited

U.S. PATENT DOCUMENTS

| | | | |
|---|---|---|---|
| 2018/0049176 A1 | 2/2018 | Park et al. | |
| 2020/0120642 A1 | 4/2020 | Hwang et al. | |
| 2022/0353900 A1* | 11/2022 | Yoshimura | ............ H04L 5/0044 |

FOREIGN PATENT DOCUMENTS

| | | |
|---|---|---|
| CN | 107734692 A | 2/2018 |
| CN | 110324897 A | 10/2019 |
| CN | 110832931 A | 2/2020 |

OTHER PUBLICATIONS

Moderator (Ericsson), FL Summary for [101-e-NR-unlic-NRU-ULSignalsChannels-01] Email discussion/approval, 3GPP TSG-RAN WG1 Meeting #101-e, R1-2004883, e-Meeting, May 25-Jun. 5, 2020.

(Continued)

*Primary Examiner* — Vinncelas Louis
(74) *Attorney, Agent, or Firm* — Price Heneveld LLP

(57) ABSTRACT

This application discloses a method for mapping a PUSCH signal, a terminal, and a network-side device. The method for mapping a PUSCH signal includes: determining, according to a frequency domain resource allocation type for the terminal and frequency domain resource allocation information for the terminal, a target resource block allocated to a PUSCH, where the target resource block includes a first target VRB or a first target PRB; determining, according to the frequency domain resource allocation type and/or a scheduling mode of the PUSCH, a mapping mode of mapping a PUSCH signal to a second target PRB, where the second target PRB is the first target PRB or a PRB corresponding to the first target VRB; and mapping the PUSCH signal to the second target PRB by using the mapping mode.

20 Claims, 7 Drawing Sheets

(51) Int. Cl.
*H04W 72/232* (2023.01)
*H04W 88/06* (2009.01)

(58) Field of Classification Search
CPC ... H04L 5/0007; H04L 5/0035; H04L 5/0044; H04L 5/0053
See application file for complete search history.

(56) References Cited

OTHER PUBLICATIONS

3GPP Organizational Partners (ARIB, ATIS, CCSA, ETSI, TSDSI, TTA, TTC), 3rd Generation Partnership Project; Technical Specification Group Radio Access Network; NR; Physical channels and modulation (Release 16), 3GPP TS 38.211 V16.1.0 (Mar. 2020).

Ericsson, Outcome of offline discussion on DCI content, TSG-RAN WG1 #91, R1-1721642, Nov. 27-Dec. 1, 2017, Reno, NV, US.

Moderator (LG Electronics), Text proposal as outcome of email discussions [101-e-NR-unlic-NRU-WB-01] and [101-e-NR-unlic-NRU-WB-02], 3GPP TSG RAN WG1 #101, R1-2004983, e-Meeting, May 25-Jun. 5, 2020.

Moderator (Ericsson), FL Summary 2 for [101-e-NR-unlic-NRU-ULSignalsChannels-01] Email discussion/approval, 3GPP TSG-RAN WG1 Meeting #101-e, R1-2004996, e-Meeting, May 25-Jun. 5, 2020.

Moderator (LG Electronics), Summary of email discussion [101-e-NR-unlic-NRU-WB-01] on DL/UL cell without intra-cell guard bands, 3GPP TSG RAN WG1 #101, R1-2004737, May 25-Jun. 5, 2020, e-Meeting.

Vivo, Remaining issues on physical UL channel design in unlicensed spectrum, 3GPP TSG RAN WG1 #102-e, R1-2005332, Aug. 17-28, 2020, e-Meeting.

"3rd Generation Partnership Project; Technical Specification Group Radio Access Network; NR; Physical layer procedures for data (Release 16)", 3GPP TS 38.214 V16.1.0 (Mar. 2020), Valbonne, France.

* cited by examiner

200

S210

Determine, according to a frequency domain resource allocation type for a terminal and frequency domain resource allocation information for the terminal, a target resource block allocated to a PUSCH

S212

Determine a mapping mode of mapping a PUSCH signal to a second target PRB

S214

Map the PUSCH signal to the second target PRB by using the mapping mode

METHOD FOR MAPPING PUSCH SIGNAL, TERMINAL, AND NETWORK-SIDE DEVICE

CROSS-REFERENCE TO RELATED APPLICATIONS

This application is a continuation application of PCT International Application No. PCT/CN2021/104005 filed on Jul. 1, 2021, which claims priority to Chinese Patent Application No. 202010634269.0, filed in China on Jul. 2, 2020 and entitled "METHOD FOR MAPPING PUSCH SIGNAL, TERMINAL, AND NETWORK-SIDE DEVICE". All of the disclosures are incorporated herein by reference in their entireties.

TECHNICAL FIELD

This application relates to the field of communications technologies, and specifically, to a method for mapping a PUSCH signal, a terminal, and a network-side device.

BACKGROUND

Currently, UL resource allocation type 1 (meaning that a frequency domain resource allocation type is UL resource allocation type 1, also known as frequency domain resource allocation type 1) is generally used for physical uplink shared channels (PUSCH) scheduled by random access response (RAR) uplink (UL) grant or PUSCHs scheduled by downlink control information (DCI) format 0_0 scrambled by a temporary cell radio network temporary identifier (TC-RNTI). A terminal (UE) determines to-be-allocated virtual resource block (VRB) resources based on a frequency domain resource allocation (FDRA) field in DCI. A PUSCH signal is first mapped to a VRB, and then mapped from the VRB to a corresponding physical resource block (PRB). When an active UL carrier bandwidth part (Bandwidth Part, BWP) for the terminal includes all resource blocks (RB) in an initial UL BWP, and has the same subcarrier spacing (SCS) and cyclic prefix (CP) as the initial UL BWP, it is necessary to confine PUSCH scheduling within the initial BWP through mapping from VRB to PRB. When a base station sends RAR UL grant or TC-RNTI scrambled DCI format 0_0, it is possible that the base station does not know whether a corresponding UE is in a radio resource control (RRC) connected state or an RRC idle state. Therefore, the base station does not know whether the UE corresponds to an active UL BWP or an initial UL BWP. In order to avoid blind detection by the base station, the terminal maps all PUSCHs to the initial UL BWP.

In the related art, only uplink resource allocation type 1 is used for resource allocation for PUSCHs scheduled by RAR UL grant or PUSCHs scheduled by TC-RNTI scrambled DCI format 0_0. If the network side configures UL resource allocation type 2 (that is, frequency domain resource allocation type 2) for the terminal, the terminal is unable to map PUSCH signals in corresponding modes according to different frequency domain resource allocation types, possibly resulting that no PUSCH signal is detected by the network side.

SUMMARY

According to a first aspect, a method for mapping a PUSCH signal is provided. The method is applied to a terminal and includes: determining, according to a frequency domain resource allocation type for the terminal and frequency domain resource allocation information for the terminal, a target resource block allocated to a PUSCH, where the target resource block includes a first target VRB or a first target PRB; determining, according to the frequency domain resource allocation type and/or a scheduling mode of the PUSCH, a mapping mode of mapping a PUSCH signal to a second target PRB, where the second target PRB is the first target PRB or a PRB corresponding to the first target VRB; and mapping the PUSCH signal to the second target PRB by using the mapping mode.

According to a second aspect, an apparatus for mapping a PUSCH signal is provided. The apparatus includes: a first determining module, configured to determine, according to a frequency domain resource allocation type for the terminal and frequency domain resource allocation information for the terminal, a target resource block allocated to a PUSCH, where the target resource block includes a first target VRB or a first target PRB; a second determining module, configured to determine, according to the frequency domain resource allocation type and/or a scheduling mode of the PUSCH, a mapping mode of mapping a PUSCH signal to a second target PRB, where the second target PRB is the first target PRB or a PRB corresponding to the first target VRB; and a mapping module, configured to map the PUSCH signal to the second target PRB by using the mapping mode.

According to a third aspect, a method for receiving a PUSCH signal is provided. The method is applied to a network-side device and includes: determining, according to a frequency domain resource allocation type configured for a terminal and frequency domain resource allocation information indicated to the terminal, a PRB allocated to a PUSCH of the terminal; and receiving, on the PRB, a PUSCH signal transmitted by the terminal.

According to a fourth aspect, an apparatus for receiving a PUSCH signal is provided. The apparatus includes: a third determining module, configured to determine, according to a frequency domain resource allocation type configured for a terminal and frequency domain resource allocation information indicated to the terminal, a PRB allocated to a PUSCH of the terminal; and a receiving module, configured to receive, on the PRB, a PUSCH signal transmitted by the terminal.

According to a fifth aspect, a terminal is provided. The terminal includes a processor, a memory, and a program or instructions stored in the memory and capable of running on the processor. When the program or instructions are executed by the processor, the steps of the method according to the first aspect are implemented.

According to a sixth aspect, a network-side device is provided. The network-side device includes a processor, a memory, and a program or instructions stored in the memory and capable of running on the processor. When the program or instructions are executed by the processor, the steps of the method according to the third aspect are implemented.

According to a seventh aspect, a readable storage medium is provided. The readable storage medium stores a program or instructions, and when the program or instructions are executed by a processor, the steps of the method according to the first aspect or the steps of the method according to the third aspect are implemented.

According to an eighth aspect, a chip is provided. The chip includes a processor and a communications interface, where the communications interface is coupled to the processor, and the processor is configured to run a program or instructions of a terminal device so as to implement the method according to the first aspect, or the processor is configured to run a program or instructions of a network-side device so as to implement the method according to the third aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that the terms used in this way are interchangeable in appropriate circumstances so that the embodiments of this application can be implemented in other orders than the order illustrated or described herein. Moreover, the objects distinguished by "first" and "second" are usually of one type, and the number of objects is not limited. For example, the first object may be one or more than one. In addition, "and/or" in the specification and claims represents at least one of connected objects, and the character "I" generally indicates that the associated objects have a "or" relationship.

It is worth noting that the technology described in the embodiments of this application is not limited to long term evolution (LTE)/LTE-Advanced (LTE-A) systems, but may also be used in other wireless communications systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" in the embodiments of this application are often used interchangeably, the technology described herein may be used in the above-mentioned systems and radio technologies as well as other systems and radio technologies. However, in the following descriptions, a new radio (NR) system is described for illustration purposes, NR terms are used in most of the following descriptions, and these technologies may also be applied to other applications than the NR system application, for example, $6^{th}$ generation (6G) communications systems.

Figure 1:
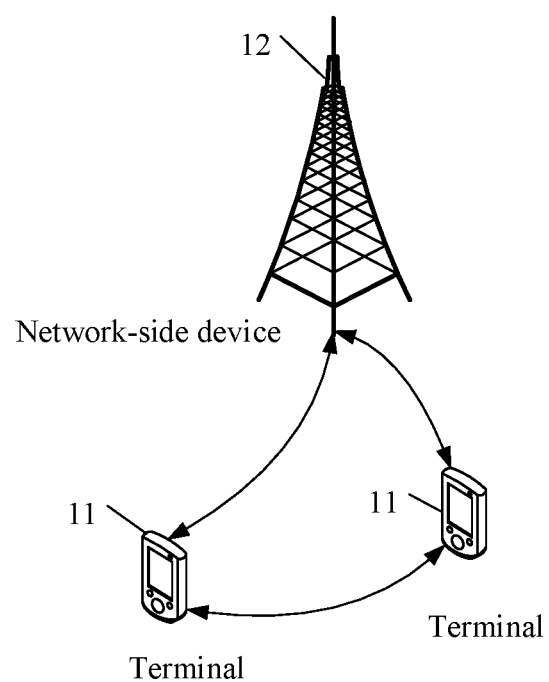
FIG. 1 is a block diagram of a wireless communications system to which the embodiments of this application may be applied.

FIG. 1 is a block diagram of a wireless communications system to which the embodiments of this application may be applied. The wireless communications system includes a terminal 11 and a network-side device 12. The terminal 11 may also be called a terminal device or user equipment (UE). The terminal 11 may be a terminal-side device such as a mobile phone, a tablet personal computer, a laptop computer or notebook computer, a personal digital assistant (PDA), a handheld computer, a netbook, an ultra-mobile personal computer (UMPC), a mobile Internet device (MID), a wearable device, vehicle-mounted user equipment (VUE), or pedestrian user equipment (PUE). The wearable device includes a bracelet, earphones, glasses, and the like. It should be noted that a specific type for the terminal 11 is not limited in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmission and reception point (TRP), or another appropriate term in the art. As long as the same technical effect is achieved, the base station is not limited to a specific technical term. It should be noted that the base station in the NR system is taken only as an example in the embodiments of this application, but a specific type of the base station is not limited.

The following describes in detail the method for mapping a PUSCH signal provided in the embodiments of this application through specific embodiments and application scenarios thereof with reference to the accompanying drawings.

Figures 2, 3A:
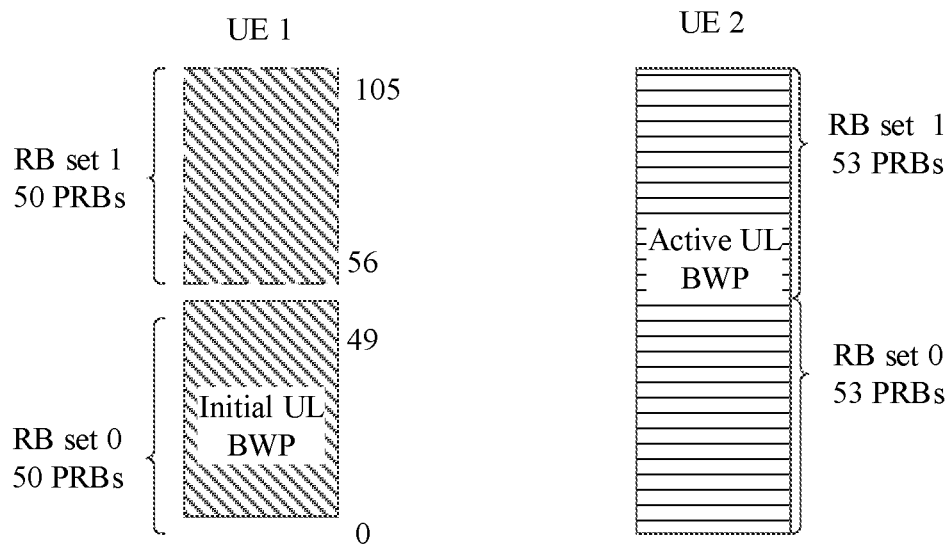
FIG. 2 is a schematic flowchart of a method for mapping a PUSCH signal according to an embodiment of this application.
FIG. 3a is a schematic diagram of one type of RB set planning according to an embodiment of this application.

FIG. 2 is a schematic flowchart of a method for mapping a PUSCH signal according to an embodiment of this application. The method 200 may be performed by a terminal. To be specific, the method may be performed by software or hardware installed on the terminal. As shown in FIG. 2, the method may include the following steps.

S210. Determine, according to a frequency domain resource allocation type for the terminal and frequency domain resource allocation information for the terminal, a target resource block allocated to a PUSCH, where the target resource block includes a first target VRB or a first target PRB.

To be specific, in this application, in S210, the determined target resource block may be a VRB or a PRB. For example, in a case that the frequency domain resource allocation type is UL resource allocation type 2, the terminal may determine a target PRB according to the frequency domain resource allocation information, and in a case that the domain resource allocation type is a UL resource allocation type 0/1, the terminal may determine a target VRB according to the frequency domain resource allocation information.

In this application, the PUSCH may be scheduled by an RAR UL grant, or the PUSCH may be scheduled by a preset downlink control information format (for example, DCI 0_0) scrambled by a TC-RNTI, or the PUSCH may be scheduled in other manners, for example, scheduled by DCI 0_1, or scheduled by DCI 0_0 scrambled by C-RNTI.

S212. Determine, according to the frequency domain resource allocation type and/or a scheduling mode of the PUSCH, a mapping mode of mapping a PUSCH signal to a second target PRB, where the second target PRB is the first target PRB or a PRB corresponding to the first target VRB.

In this application, in a case that the target resource block determined in S210 is the first target PRB, the second target PRB is the first target PRB, and in a case that the target resource block determined in S210 is the first target VRB, the second target PRB is a PRB corresponding to the first target VRB.

S214. Map the PUSCH signal to the second target PRB by using the mapping mode.

In S214, after determining the mapping mode, the PUSCH signal is mapped to the second target PRB by using the mapping mode.

In this embodiment of this application, a target VRB or target PRB allocated to a PUSCH is determined according to a frequency domain resource allocation type for the terminal and frequency domain resource allocation information for the terminal; a mapping mode of mapping a PUSCH signal to the target PRB is determined according to the frequency domain resource allocation type and/or a scheduling mode of the PUSCH; and the PUSCH signal is mapped to the target PRB by using the mapping mode. In this way, the terminal can perform mapping on the PUSCH signal in corresponding modes according to different frequency domain resource allocation types, so that a base station can effectively detect the PUSCH signal sent by the terminal, improving effectiveness of a communications system.

In actual application, for a frequency domain resource allocation type 1, for example, for PUSCH scheduled by DCI 0_0 scrambled by a TC-RNTI, UE may determine, according to FDRA indication information on a low band within an active UL BWP, a VRB allocated to the PUSCH. That is, FDRA starts from the first RB of the active UL BWP and the maximum number of RBs is equal to the number of RBs in an initial UL BWP. Through mapping from the VRB to the PRB, it can be ensured that the PUSCH is transmitted within the initial UL BWP. However, when the UE operates on an unlicensed band, the UE may be configured to use uplink resource allocation type 2. In frequency domain resource allocation type 2, the UE determines, according to an RB set in which the PRACH is located, an RB set allocated to the PUSCH, where a corresponding RB may already correspond to the initial UL BWP.

When the UE operates on the unlicensed band, that is, accessing a shared spectrum channel, the UE may configure an intra-cell guard band ($N_{RB-set}-1$) intra-cell guard bands) (which $N_{RB-set}-1$) may be equal to 0, meaning no intra-cell guard band) of a carrier with a parameter intraCellGuardBandUL-r16 or intraCellGuardBandDL-r16, where each intra-cell guard band is defined as a start common resource block (CRB) and the number of CRBs, namely, $GB_{s,x}^{start,\mu}$ and $G_{s,x}^{size,\mu}$, and the intra-cell guard bands divide the carrier into $N_{RB-set}$ RB sets (RB sets), with each RB set defined by the start CRB and the end CRB, namely $RB_{s,x}^{start,\mu}$ and $RB_{s,x}^{end,\mu}$. The UE determines indexes of the start CRB and the end CRB of each RB set in the following manners.

For a first RB set: $RB_{0,x}^{start,\mu}=N_{grid,x}^{start,\mu}$; and for the $(N_{RB-set}-1)^{th}$ RB set: $RB_{N_{RB-set}-1,x}^{end,\mu}=N_{grid,x}^{start,\mu}+N_{grid,x}^{size,\mu}-1$, where $N_{grid,x}^{start,\mu}$ is an index of the start CRB of the carrier, $N_{grid,x}^{size,\mu}$ is the total number of RBs included in the carrier, and a corresponding link is identified by a different subscript x to be DL or UL.

For the remaining RB sets: $RB_{s,x}^{end,\mu}=N_{grid,x}^{start,\mu}+GB_{s,x}^{start,\mu}-1$ and $RB_{s+1,x}^{start,\mu}=N_{grid,x}^{start,\mu}+GB_{s,x}^{start,\mu}+GB_{s,x}^{size,\mu}$.

In a case that the UE is not configured with intraCellGuardBandUL-r16, the UE determines a CRB index (if any) corresponding to the intra-cell guard band according to a nominal intra-cell guard band and an RB set pattern predefined in a corresponding subcarrier spacing (SCS) μ and carrier size $N_{grid,x}^{size,\mu}$).

For DL and/or UL, in a case that the predefined nominal intra-cell guard band and RB set pattern do not include any intra-cell guard band, the number of RB sets of the carrier is 1, that is, $N_{RB-set,x}=1$.

For one carrier, $N_{BWP,i}^{start,\mu}=RB_{s0,x}^{start,\mu}$ and $N_{BWP,i}^{size,\mu}=RB_{s1,x}^{end,\mu}-RB_{s0,x}^{start,\mu}+1$, where for BWP i, parameter BWP-DownlinkCommon or parameter BWP-DownlinkDedicated is used for configuring DL BWP, or parameter BWP-UplinkCommon or parameter BWP-UplinkDedicated is used for configuring UL BWP, and $0 \le s0 \le s1 \le N_{RB-set,x}-1$. In BWP RB sets are numbered in ascending order from 0 to $N_{RB-set,x}^{BWP}-1$, where $N_{RB-set,x}^{BWP}$ represents the number of RB sets included in BWP i, RB set 0 of BWP i corresponds to RB set s0 of the carrier, and RB set $N_{RB-set,x}^{BWP}-1$ RB set of BWP i corresponds to RB set s1 of the carrier.

For example, in FIG. 3a, in a case that a band of a carrier is 40 MHz and an SCS is 30 KHz, the carrier contains 106 RBs and 5 interlaces in total, assuming that corresponding CRB numbers are 0, 1, . . . , 105, respectively. The initial UL BWP corresponds to the first RB set of the carrier, that is, RB set 0. UE1 operates on the initial UL BWP, and UE 2 operates on an active UL BWP, where the active UL BWP includes two RB sets. The intra-cell guard band may be configured per UE, and therefore UE 1 and UE 2 may be configured with different intra-cell guard bands for the carrier. For example, in FIG. 3a, UE 1 operates on an initial UL BWP (the initial UL BWP ranges from CRB 0 to CRB 49, which is equivalent to RB set 0 of the carrier in a case that the intra-cell guard band is configured as CRB 50 to CRB 55). The intra-cell guard band configured for UE 2 is 0, meaning that there is no intra-cell guard band between RB set 0 and RB set 1. Therefore, for UE 1, the initial UL BWP (the RB set 0 of the carrier, which is also the RB set 0 of the initial UL BWP herein) consists of only 50 available RBs; for UE 2, the RB set 0 of the carrier is RB set 0 of the carrier, which is also the RB set 0 of the active UL BWP, including 53 RBs. Similarly, for interlace 0 of RB set 0, the number of RBs corresponding to UE1 is different from the number of RBs corresponding to UE2. For example, indexes of CRBs corresponding to interlace 0 of RB set 0 of UE 1 include 0, 5, 10, 15, 20, . . . , 40, 45. Whereas, indexes of CRBs corresponding to interlace 0 of RB set 0 of UE 2 include 0, 5, 10, 15, 20, . . . , 40, 45, 50. It can be found that the CRBs corresponding to interlace 0 of RB set 0 of UE 2 has one more CRB than interlace 0 of RB set 0 of UE 1.

In a case that PRACH resources for UE 1 and UE 2 are both configured at a physical resource position corresponding to the initial UL BWP (that is, on RB set 0 of the carrier), when a base station receives a PRACH at this position, the base station sends a RAR UL grant to schedule the UE to transmit a PUSCH within the RB set. However, the base station is unable to determine whether the PRACH is sent by UE 1 or UE 2. Consequently, the base station is unable to know a value of an intra-cell guard band corresponding to the PUSCH, and thus cannot determine whether its scheduled PUSCH is sent on CRBs 0, 5, 10, 15, 20, . . . , 40, 45 or on CRBs 0, 5, 10, 15, 20, . . . , 40, 45, 50. The same problem also occurs for DCI 0_0 scrambled by a TC-RNTI.

Figure 3B:
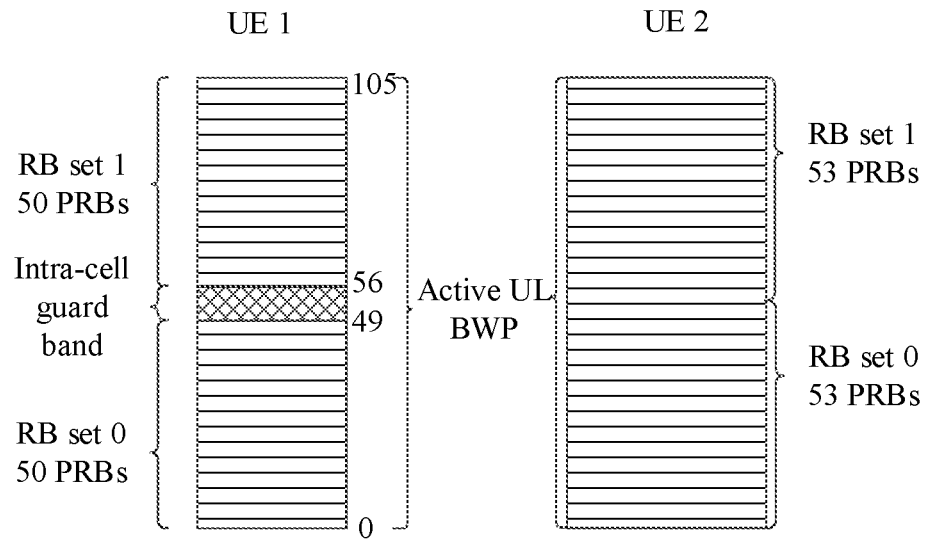
FIG. 3b is a schematic diagram of one type of RB set planning according to an embodiment of this application.

For another example, in FIG. 3b, UE 1 and UE 2 both operate on an active UL BWP; however, because an intra-cell guard band may be configured per UE, intra-cell guard bands for UE1 and UE2 may be different. As shown in FIG. 3b, the intra-cell guard band for UE 1 is configured as CRB 50 to CRB 55, and the intra-cell guard band for UE 2 is configured as 0, meaning that there is no intra-cell guard band between RB set 0 and RB set 1. Therefore, in a case that PRACH resources are configured on RB set 0 or RB set 1 for both UE 1 and UE 2, the base station sends, after receiving a PRACH, a RAR UL grant to schedule the UE to transmit the PUSCH within the RB set. However, the base station is unable to determine whether the PRACH is sent by UE 1 or UE 2. Consequently, the base station is unable to know the value of the intra-cell guard band corresponding to the PUSCH. For example, in a case that interlace 0 is allocated to the PUSCH, the base station is unable to determine whether the scheduled PUSCH is sent on CRBs 0, 5, 10, 15, 20, . . . , 40, 45 or send on CRBs 0, 5, 10, 15, 20, . . . , 40, 45, 50. The same problem also occurs for DCI 0_0 scrambled by a TC-RNTI.

In order to resolve this problem, in a possible implementation of this embodiment of this application, S210 may include: in a case that the frequency domain resource allocation type is UL resource allocation type 2, and that the PUSCH is scheduled by an RAR uplink UL grant or the PUSCH is scheduled by a preset downlink control information format scrambled by a TC-RNTI, determining a common resource block (CRB) range of a target RB set, where the target RB set is an RB set allocated to the PUSCH; and determining, based on the CRB range and the frequency domain resource allocation information, the first target PRB allocated to the PUSCH. To be specific, in this optional implementation, in the case that the frequency domain resource allocation type is UL resource allocation type 2, and that the PUSCH is scheduled by an RAR uplink UL grant or the PUSCH is scheduled by a preset downlink control information format scrambled by a TC-RNTI, the CRB range of the target RB set is determined first, and then the first target PRB allocated to the PUSCH is determined based on the CRB range of the target RB set and the frequency domain resource allocation information. For example, after the CRB range of the target RB set is determined, an intersection of interlaces indicated by the frequency domain resource allocation information and the target RB set is found and determined as the CRB or PRB (that is, the first target PRB) allocated to the PUSCH.

In the foregoing possible implementation, in a case that the frequency domain resource allocation type is not configured as the UL resource allocation type 2, in S210, the first target VRB allocated to the PUSCH may be determined according to the frequency domain resource allocation information. In a case that the frequency domain resource allocation type is configured as the UL resource allocation type 2 but the PUSCH is scheduled in a form other than the RAR UL grant and the preset downlink control information scrambled by the TC-RNTI, in S210, the first target PRB allocated to the PUSCH may be determined according to the frequency domain resource allocation information and the RB set determined on the intra-cell guard band configured for the UE.

In the foregoing possible implementation, during determining of the CRB range of the target RB set, the CRB range of the target RB set may be determined according to a first RB set panning scheme. That is, the UE determines the CRB range of the target RB set according to the first RB set planning scheme.

In the foregoing possible implementation, before determining of the CRB range of the target RB set, the first RB set planning scheme for the carrier may alternatively be determined according to a nominal intra-cell guard band and an RB set pattern of the carrier. To be specific, in this possible implementation, the UE determines the first RB set planning scheme for the carrier according to the nominal intra-cell guard band and the RB set pattern prescribed by a protocol.

In another possible implementation, during determining of the CRB range of the target RB set, in a case that an active UL BWP satisfies a first condition and a second condition, the CRB range of the target RB set is determined according to the first RB set planning scheme, where the first condition is that the active UL BWP includes all RBs in the initial UL BWP, and the second condition is that the active UL BWP has the same subcarrier spacing (SCS) and cyclic prefix (CP) as the initial UL BWP; or in a case that the active UL BWP does not satisfy the first condition and/or does not satisfy the second condition, a CRB range of resource blocks in the target RB set is determined according to a second RB set planning scheme.

In the foregoing possible implementation, before determining of the CRB range of the target RB set, the second RB set planning scheme for the carrier may alternatively be determined according to an intra-cell guard band configured for the terminal.

To be specific, in this possible implementation, in the case that the active UL BWP includes all RBs in the initial UL BWP and has the same SCS and CP as the initial UL BWP, the range of the RB set in which the PUSCH is located is the same as the CRB range corresponding to the initial UL BWP (that is, the RB set planning is determined according to the nominal intra-cell guard bandwidth and the RB set pattern), and in other cases, the PRB range corresponding to the RB set in which the PUSCH is located is determined according to the RB set determined on the intra-cell guard band configured for the UE. It should be noted that, in a case that the UE is not configured with an intra-cell guard band at this time, the UE may alternatively determine the RB set according to the nominal intra-cell guard band and the RB set pattern.

In actual application, in a case that the frequency domain resource allocation type is UL resource allocation type 2, the terminal may determine that the mapping mode of mapping the PUSCH signal to the second target PRB may be directly mapping the PUSCH signal to the second target PRB, or the terminal may use a mapping mode of mapping the PUSCH signal to a VRB first and then to a PRB. Because the CRB or the PRB are determined by the UE according to the resource allocation information, physical resources of the PUSCH may deviate from the initial UL BWP of the UE in a case that mapping is performed in an existing mode.

Figure 4:
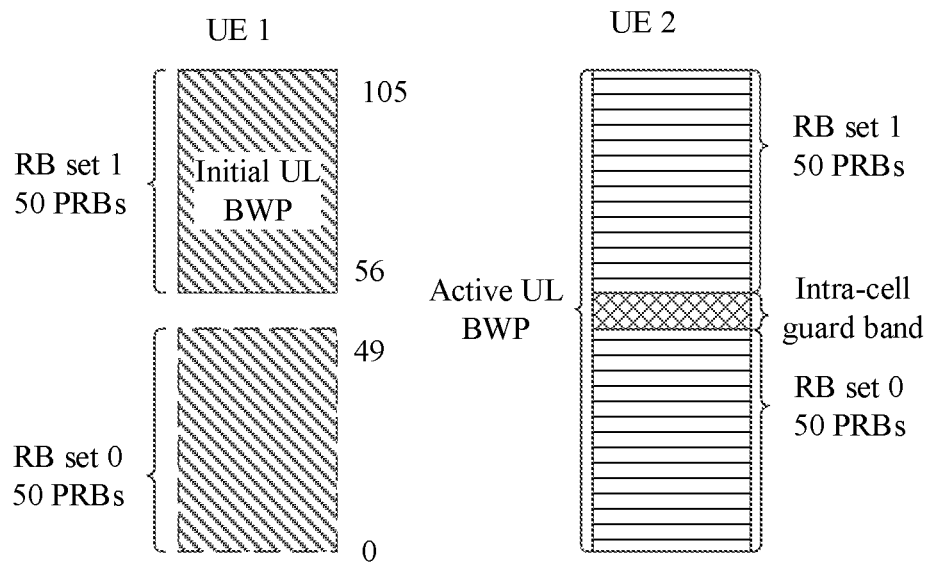
FIG. 4 is a schematic diagram of another type of RB set planning according to an embodiment of this application.

For example, in FIG. 4, UE 1 operates on an initial UL BWP (corresponding to the carrier or a location of RB set 1 of active UL BWP for UE 2), UE 2 operates on an active UL BWP, and the active UL BWP for UE 2 include all RBs in the initial UL BWP and has the same SCS and CP as the initial UL BWP.

After determining the VRB allocated to the PUSCH, the UE determines the corresponding PRB according to the mapping from the VRB to the PRB. A non-interlaced mapping mode is used for mapping as specified in the related art. In the non-interlaced mapping, for the PUSCH that is scheduled by a RAR UL grant or by a TC-RNTI scrambled DCI format 0_0 and that is transmitted on active BWP i (a starting RB index is $N_{BWP,i}^{start}$), in a case that the active UL BWP includes all RBs of the initial UL BWP (a starting CRB index is $N_{BWP,0}^{start}$) and has the same SCS and CP as the initial UL BWP, VRB n is mapped to PRB $n+N_{BWP,0}^{start}-N_{BWP,i}^{start}$, and VRB n is mapped to PRB n.

For example, in FIG. 4, in a case that UE 2 sends a PRACH on RB set 1, the base station sends, after receiving the PRACH, a RAR UL grant to schedule the UE to transmit the PUSCH. Because the RB set in which the PUSCH is located is the same as the RB set in which the PRACH is located, UE 2 determines that RB set 1 is allocated to the corresponding PUSCH. In a case that the frequency domain resource allocation type for UE 2 is UL resource allocation type 2, UE 2 determines, according to an FDRA indication in the RAR UL grant, an interlace index allocated to the PUSCH; determines an allocated CRB/PRB according to RB set 0 (for example, in FIG. 4, UE 2 sends the PRACH on RB set 1, and the base station allocates interlace 0 according to the indication in the RAR UL grant; it is assumed that the intra-cell guard band is CRBs 50 to 55, the CRBs corresponding to interlace 0 on RB set 1 are 60, 65, . . . , 105, and the corresponding PRBs may be determined to be 60, 65, . . . , 105 according to a correspondence:

$$n_{CRB}^{\mu} = n_{PRB}^{\mu} + N_{BWP,i}^{start,\mu}$$

where $N_{BWP,i}^{start}$ is an index of the start CRB of the active UL BWP, and $N_{BWP,i}^{start}=0$); then determines corresponding VRBs (PRB n corresponds to VRB n); and finally maps the signal to the VRBs and then to the PRBs according to a mapping rule from the VRBs to the PRBs. According to the foregoing rule, because the active UL BWP includes all RBs in the initial UL BWP and has the same SCS and CP as the initial UL BWP, UE 1 maps VRB n to PRB $n+N_{BWP,0}^{start}-N_{BWP,i}^{start}$, where $N_{BWP,0}^{start}=56$, $N_{BWP,i}^{start}=0$, and maps VRB 55 to PRB 55+56=111. However, 111 is greater than a size of the active UL BWP of the UE. Therefore, the mapping rule from VRBs to the PRBs is not applicable to the uplink resource allocation type 2.

Therefore, in a possible implementation of this application, S212 may include the following steps 1 to 3.

Step 1. Determine, according to the frequency domain resource allocation type for the terminal, an index value of a second target VRB allocated to the PUSCH.

Optionally, in a case that the terminal is configured to use interlaced PUSCH or configured with UL resource allocation type 2, it is determined that the index value of the second target VRB is equal to an index value of the first target PRB determined in S210. The first target PRB is determined based on an interlace index M allocated to the PUSCH and the RB set allocated to the PUSCH. For example, allocated RBs are determined according to an intersection of RBs corresponding to an allocated interlace and RBs corresponding to a set of the allocated RB set and the intra-cell guard band; or in a case that one RB set is allocated, the CRB range of the RB set allocated to the PUSCH is determined according to an intersection of the RBs corresponding to the allocated interlace and the RBs corresponding to the allocated RB set, and an intersection of the determined CRB range and CRBs corresponding to the interlace is found and determined as the RB (CRB or PRB, where the PRB may be determined according to the CRB) allocated to the PUSCH.

Then it is determined that VRB index=PRB index. For example, in FIG. 4, assuming that UE 2 is allocated with RB set 1 and interlace 0, corresponding VRB indexes are 60, 65, 70, . . . , 100, 105.

In a case that the terminal is not configured to use interlaced PUSCH or not configured with UL resource allocation type 2, the second target VRB is determined to be the first target VRB. To be specific, the second target VRB is determined according to the frequency domain resource allocation information for the UE.

Step 2. Multiply the PUSCH signal by an amplitude scaling factor, and map the resulting PUSCH signal to the second target VRB.

Multiplying the PUSCH signal by an amplitude scaling factor may facilitate power control of the PUSCH signal.

Step 3. In a case that the PUSCH is scheduled by the RAR UL grant or the PUSCH is scheduled by the preset downlink control information format scrambled by the TC-RNTI, a mapping mode of mapping the PUSCH signal from the second target VRB to the second target PRB is determined according to whether the terminal is configured to use interlaced PUSCH or whether the terminal is configured with UL resource allocation type 2.

Whether the terminal is configured to use interlaced PUSCH may be determined according to whether the terminal is configured with high-layer signaling, for example, parameter useInterlacePUCCH-PUSCH-Common; and in a case that this parameter is configured, it indicates that the terminal is configured to use interlaced PUSCH; otherwise, it indicates that the terminal is not configured to use interlaced PUSCH.

In addition, whether the terminal is configured to use interlaced PUSCH may be determined according to whether the terminal is configured with high-layer signaling, for example, parameter useInterlacePUCCH-PUSCH-Common; and in a case that this parameter is configured, it indicates that the terminal is configured to use interlaced PUSCH, and in the case that this parameter is configured, it may also indicate that the terminal is configured with UL resource allocation type 2.

Optionally, in a case that the PUSCH is neither scheduled by the RAR UL grant nor scheduled by the preset downlink control information format scrambled by a TC-RNTI, it may be determined that a mapping mode of mapping the PUSCH signal from the second target VRB to the second target PRB is the mapping mode from the VRB n to the PRB n, regardless of whether the terminal is configured with resource allocation type 0/1 or resource allocation type 2.

In a possible implementation, in the case that a mapping mode of mapping the PUSCH signal from the second target VRB to the second target PRB is determined according to whether the terminal is configured to use interlaced PUSCH or whether the terminal is configured with UL resource allocation type 2, the PUSCH signal is mapped from the second target VRB to the second target PRB by using a non-interlaced mode. In a case that the terminal is not configured to use interlaced PUSCH or the terminal is not configured with UL resource allocation type 2, and in a case that the active UL BWP includes all RBs in the initial UL BWP and has the same subcarrier spacing SCS and cyclic prefix CP as the initial UL BWP, the $n^{th}$ second target VRB is mapped to the $(n+N_{BWP,0}^{start}-N_{BWP,i}^{start})^{th}$ second target PRB, where $N_{BWP,0}^{start}$ is an index of the start CRB of the initial UL BWP, $N_{BWP,i}^{start}$ is an index of the start CRB of the active UL BWP, and n is an integer greater than or equal to 0. In a case that the active UL BWP does not include all RBs in the initial UL BWP and/or the active UL BWP does not have the same SCS and/or CP as the initial UL BWP, the $n^{th}$ second target VRB is mapped to the $n^{th}$ second target PRB. In a case that the terminal is configured to use interlaced PUSCH or configured with UL resource allocation type 2, the PUSCH signal is mapped from the second target VRB to the second target PRB by using a mode of mapping the $n^{th}$ second target VRB to the $n^{th}$ second target PRB.

In the foregoing possible implementation, in the case that the terminal is configured to use interlaced PUSCH or configured with UL resource allocation type 2, the PUSCH signal is mapped from the second target VRB to the second target PRB by using a mode of mapping the $n^{th}$ second target VRB to the $n^{th}$ second target PRB. This can avoid exceeding a size of the active UL BWP for the UE during mapping from the VRB to the PRB, or in some cases, the PUSCH is mapped on a non-initial UL BWP, which leads to a problem that the base station detects no PUSCH signal or detect an incomplete PUSCH signal.

In another possible implementation, in S212, when determining the mapping mode of mapping the PUSCH signal to the second target PRB, S212 may also include: in a case that the terminal is configured to use interlaced PUSCH or configured with UL resource allocation type 2, determining the mapping mode to be a second mapping mode, and in other cases, determining the mapping mode to be a first mapping mode, where the first mapping mode is mapping a PUSCH signal to a VRB first and then mapping the PUSCH signal from the VRB to a PRB, and the second mapping mode is directly mapping a PUSCH signal to a PRB. To be specific, in this possible implementation, in the case that the terminal is configured to use interlaced PUSCH or configured with UL resource allocation type 2, the mapping method is determined to directly map the PUSCH signal to the PRB determined in S210, and in other cases, the mapping method is determined to map the PUSCH signal to the VRB and then map the PUSCH from the VRB to the PRB, in other words, the mapping is performed according to the mapping mode of UL resource allocation type 0/1.

In the foregoing possible implementation, in a case that the mapping mode is the second mapping mode, in S214, the PUSCH signal is multiplied by an amplitude scaling factor, and then the resulting PUSCH signal is mapped to the determined first target PRB.

With the technical solutions provided in this application, when different UEs share the same RACH resource, the problem of blind detection of PUSCH by the base station due to different intra-cell guard bands configured for the different UEs is avoided. In addition, the UE determines a PUSCH resource mapping mode according to whether the UE is configured with useInterlace PUCCH-PUSCH-Common or whether the UE is configured with UL resource allocation type 2, which improves effectiveness of a communications system.

It should be noted that the method for mapping a PUSCH signal provided in this embodiment of this application may be executed by an apparatus for mapping a PUSCH signal or a control module, for executing the method for mapping a PUSCH signal, in the apparatus for mapping a PUSCH signal. In an embodiment of this application, an apparatus for mapping a PUSCH signal for executing the method for mapping a PUSCH signal is used as an example to describe the apparatus for mapping a PUSCH signal according to the embodiments of this application.

Figure 5:
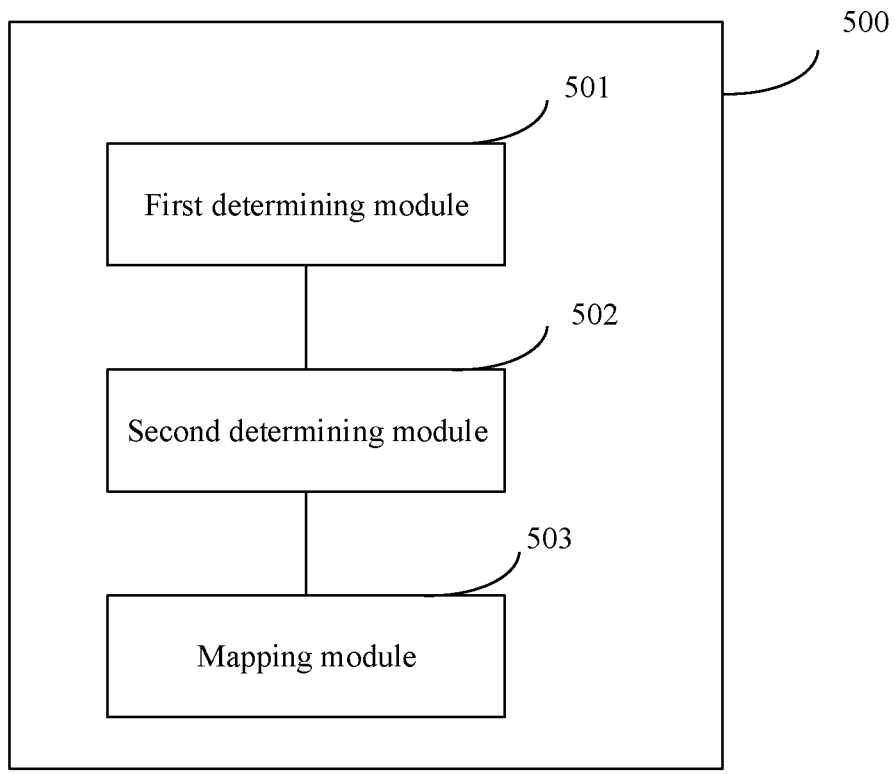
FIG. 5 is a schematic structural diagram of an apparatus for mapping a PUSCH signal according to an embodiment of this application.

FIG. 5 is a schematic structural diagram of an apparatus for mapping a PUSCH signal according to this application. As shown in FIG. 5, the apparatus 500 for mapping a PUSCH signal mainly includes: a first determining module 501, a second determining module 502, and a mapping module 503.

In this application, the first determining module 501 is configured to determine, according to a frequency domain resource allocation type for a terminal and frequency domain resource allocation information for the terminal, a target resource block allocated to a PUSCH, where the target resource block includes a first target virtual resource block VRB or a first target physical resource block PRB; the second determining module 502 is configured to determine, according to the frequency domain resource allocation type and/or a scheduling mode of the PUSCH, a mapping mode of mapping a PUSCH signal to a second target PRB, where the second target PRB is the first target PRB or a PRB corresponding to the first target VRB; and the mapping module 503 is configured to map the PUSCH signal to the second target PRB by using the mapping mode.

In a possible implementation, that the first determining module 501 determines, according to a frequency domain resource allocation type for a terminal and frequency domain resource allocation information for the terminal, a target resource block allocated to a PUSCH includes: in a case that the frequency domain resource allocation type is UL resource allocation type 2, and that the PUSCH is scheduled by a random access response RAR uplink UL grant or the PUSCH is scheduled by a preset downlink control information format scrambled by a temporary cell radio network temporary identifier TC-RNTI, determining a common resource block CRB range of a target resource block RB set, where the target RB set is an RB set allocated to the PUSCH; and determining, based on the CRB range and the frequency domain resource allocation information, the PRB allocated to the PUSCH.

In a possible implementation, that the first determining module 501 determines a common resource block CRB range of a target resource block RB set includes: determining the CRB range of the target RB set according to a first RB set planning scheme.

In a possible implementation, the first determining module 501 is further configured to, before determining the CRB range of the target RB set according to the first RB set planning scheme, determine the first RB set planning scheme for a carrier according to a nominal intra-cell guard band and an RB set pattern of the carrier.

In another possible implementation, that the first determining module determines a common resource block CRB range of a target resource block RB set includes: in a case that an active UL carrier bandwidth part BWP satisfies a first condition and a second condition, determining the CRB range of the target RB set according to a first RB set planning scheme, where the first condition is that the active UL BWP includes all RBs in an initial UL BWP, and the second condition is that the active UL BWP has the same subcarrier spacing SCS and cyclic prefix CP as the initial UL BWP; or in a case that the active UL BWP does not satisfy the first condition and/or does not satisfy the second condition, determining a CRB range of resource blocks in the target RB set according to a second RB set planning scheme.

In a possible implementation, the first determining module 501 is further configured to: before determining the CRB range of resource blocks in the target RB set according to the second RB set planning scheme, determine the second RB set planning scheme for a carrier according to an intra-cell guard band configured for the terminal.

In a possible implementation, that the second determining module 502 determines, according to the frequency domain resource allocation type for the terminal and/or a scheduling mode of the PUSCH, a mapping mode of mapping a PUSCH signal to a second target PRB includes: determining, according to the frequency domain resource allocation type for the terminal, an index value of a second target VRB allocated to the PUSCH; multiplying the PUSCH signal by an amplitude scaling factor, and mapping the resulting PUSCH signal to the second target VRB; and in a case that the PUSCH is scheduled by the RAR UL grant or the PUSCH is scheduled by the preset downlink control information format scrambled by the TC-RNTI, determining, according to whether the terminal is configured to use interlaced PUSCH or whether the terminal is configured with UL resource allocation type 2, a mapping mode of mapping the PUSCH signal from the second target VRB to the second target PRB.

In a possible implementation, that the second determining module 502 determines, according to the frequency domain resource allocation type for the terminal, an index value of a second target VRB allocated to the PUSCH includes: in a case that the terminal is configured to use interlaced PUSCH or configured with UL resource allocation type 2, determining that the index value of the second target VRB is equal to an index value of the determined first target PRB; and in a case that the terminal is not configured to use interlaced PUSCH or the terminal is not configured with UL resource allocation type 2, determining that the second target VRB is the first target VRB.

In a possible implementation, that the second determining module 502 determines, according to whether the terminal is configured to use interlaced PUSCH or the terminal is configured with UL resource allocation type 2, a mapping mode of mapping the PUSCH signal from the second target VRB to the second target PRB includes:

in a case that a first target condition, a second target condition, and a third target condition are all satisfied, mapping the $n^{th}$ second target VRB to the $(n+N_{BWP,0}^{start}-N_{BWP,i}^{start})^{th}$ second target PRB, where $N_{BWP,0}^{start}$ is a start CRB index of the initial UL BWP, $N_{BWP,i}^{start}$ is a start CRB index of the active UL BWP, and n is an integer greater than or equal to 0; and in a case that one or more of the first target condition, the second target condition, and the third target condition are not satisfied, mapping the $n^{th}$ second target VRB to the $n^{th}$ second target PRB; where the first target condition is that the terminal is not configured to use interlaced PUSCH or not configured with UL resource allocation type 2; the second target condition is that the active UL BWP comprises all RBs in the initial UL BWP; and the third target condition is that the active UL BWP has the same subcarrier spacing SCS and cyclic prefix CP as the initial UL BWP.

In another possible implementation, that the second determining module 502 determines, according to the frequency domain resource allocation type and/or a scheduling mode of the PUSCH, a mapping mode of mapping a PUSCH signal to a second target PRB includes: in a case that the terminal is configured to use interlaced PUSCH or the terminal is configured with UL resource allocation type 2, determining the mapping mode to be a second mapping mode, and in other cases, determining the mapping mode to be a first mapping mode, where the first mapping mode is mapping a PUSCH signal to a virtual resource block VRB first and then mapping the PUSCH signal from the VRB to a PRB, and the second mapping mode is directly mapping a PUSCH signal to a PRB.

In a possible implementation, that the mapping module 503 maps the PUSCH signal to the second target PRB by using the mapping mode includes: in a case that the mapping mode is the second mapping mode, multiplying the PUSCH signal by an amplitude scaling factor, and then mapping the resulting PUSCH signal to the determined first target PRB.

The apparatus for mapping a PUSCH signal in this embodiment of this application may be an apparatus, or may be a component, an integrated circuit, or a chip in the terminal. The apparatus may be a mobile terminal or a non-mobile terminal. For example, the mobile terminal may include but is not limited to the types of terminals 11 listed above, and the non-mobile terminal may be a server, a network attached storage (NAS), a personal computer (PC), a television (TV), an automated teller machine, a self-service machine or the like, which are not specifically limited in the embodiments of this application.

The apparatus for mapping a PUSCH signal in this embodiment of this application may be an apparatus having an operating system. The operating system may be an Android operating system, may be an iOS operating system, or may be another possible operating system. This is not specifically limited in the embodiments of this application.

The apparatus for mapping a PUSCH signal provided in this embodiment of this application can implement the processes implemented by the method embodiments in FIG. 2 to FIG. 4. To avoid repetition, details are not described herein again.

Figure 6:
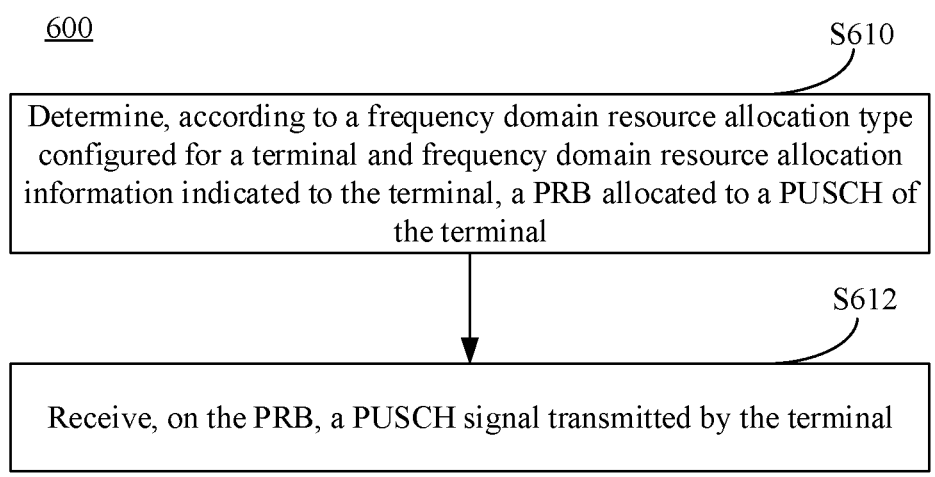
FIG. 6 is a schematic flowchart of a method for receiving a PUSCH signal according to an embodiment of this application.

FIG. 6 is a schematic flowchart of a method for receiving a PUSCH signal according to an embodiment of this application. The method 600 may be performed by a network-side device. To be specific, the method may be performed by software or hardware installed on the network-side device. As shown in FIG. 6, the method may include the following steps.

S610. Determine, according to a frequency domain resource allocation type configured for a terminal and frequency domain resource allocation information indicated to the terminal, a PRB allocated to a PUSCH of the terminal.

In specific application, the network-side device may determine the PRB allocated to the PUSCH for the terminal in the same manner as the terminal.

For example, in a possible implementation, S610 may include: in a case that the frequency domain resource allocation type is UL resource allocation type 2, and that the PUSCH is scheduled by an RAR uplink UL grant or the PUSCH is scheduled by a preset downlink control information format scrambled by a TC-RNTI, determining a CRB range of a target resource block RB set, where the target RB set is an RB set allocated to the PUSCH; and determining, based on the CRB range and the frequency domain resource allocation information, the PRB allocated to the PUSCH.

In the foregoing possible implementation, the determining a common resource block CRB range of a target resource block RB set includes: determining a CRB range of resource blocks in the target RB set according to a first RB set planning scheme. For details, refer to related descriptions in S210. The details are not described herein again.

Optionally, in a possible implementation, before determining the CRB range of the target RB set, the method further includes: determining the first RB set planning scheme for a carrier according to a nominal intra-cell guard band and an RB set pattern of the carrier.

In the foregoing possible implementation, the determining a common resource block CRB range of a target resource block RB set may further include: in a case that an active UL carrier bandwidth part BWP satisfies a first condition and a second condition, determining a CRB range of resource blocks in the target RB set according to the first RB set planning scheme, where the first condition is that the active UL BWP includes all RBs in an initial UL BWP, and the second condition is that the active UL BWP has the same subcarrier spacing SCS and cyclic prefix CP as the initial UL BWP; or in a case that the active UL BWP does not satisfy the first condition and/or does not satisfy the second condition, determining a CRB range of resource blocks in the target RB set according to a second RB set planning scheme.

Optionally, before the determining a CRB range of resource blocks in the target RB set according to a second RB set planning scheme, the method further includes: determining the second RB set planning scheme according to an intra-cell guard band configured for the terminal.

For detailed manner, refer to related descriptions in S210 of the method 200. The details are not described herein again.

S612. Receive, on the PRB, a PUSCH signal transmitted by the terminal.

In the technical solution provided in this application, after determining the PRB allocated to the terminal, the network-side device (including but not limited to a base station) may detect the PUSCH signal on the PRB, which prevents the network-side device from performing blind detection on PUSCH signals, thereby improving accuracy of PUSCH signal detection.

It should be noted that the method for receiving a PUSCH signal provided in this embodiment of this application may be executed by an apparatus for receiving a PUSCH signal or a control module, for executing the method for receiving a PUSCH signal, in the apparatus for receiving a PUSCH signal. In an embodiment of this application, an apparatus for receiving a PUSCH signal for executing the method for receiving a PUSCH signal is used as an example to describe the apparatus for receiving a PUSCH signal according to the embodiments of this application.

Figure 7:
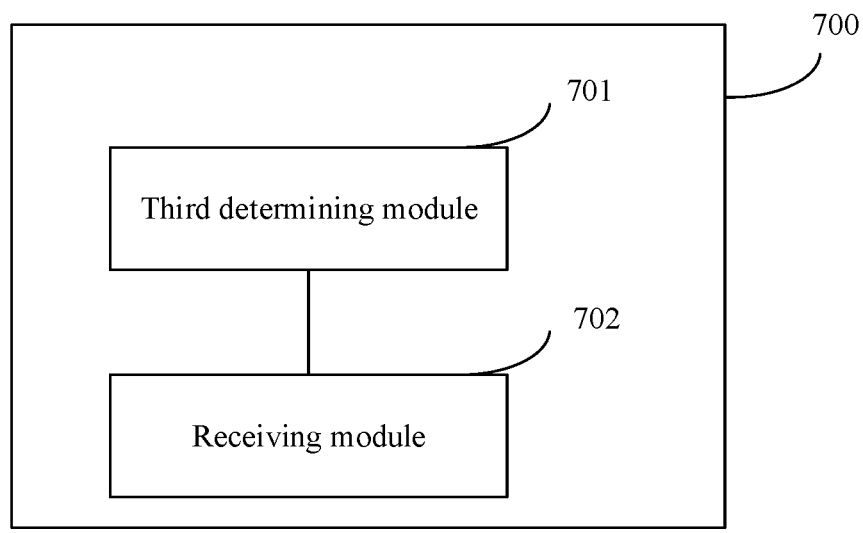
FIG. 7 is a schematic structural diagram of an apparatus for receiving a PUSCH signal according to an embodiment of this application.

FIG. 7 shows a schematic structural diagram of an apparatus for receiving a PUSCH signal according to this application. As shown in FIG. 7, the apparatus 700 for receiving a PUSCH signal mainly includes: a third determining module 701 and a receiving module 702.

In this embodiment of this application, the third determining module 701 is configured to determine, according to a frequency domain resource allocation type configured for a terminal and frequency domain resource allocation information indicated to the terminal, a PRB allocated to a PUSCH of the terminal; and the receiving module 702 is configured to receive, on the PRB, a PUSCH signal transmitted by the terminal.

In a possible implementation, that the third determining module 701 determines, according to a frequency domain resource allocation type configured for a terminal and frequency domain resource allocation information indicated to the terminal, a PRB allocated to a PUSCH of the terminal includes: in a case that the frequency domain resource allocation type is UL resource allocation type 2, and that the PUSCH is scheduled by a random access response RAR uplink UL grant or the PUSCH is scheduled by a preset downlink control information format scrambled by a temporary cell radio network temporary identifier TC-RNTI, determining a common resource block CRB range of a target resource block RB set, where the target RB set is an RB set allocated to the PUSCH; and determining, based on the CRB range and the frequency domain resource allocation information, the PRB allocated to the PUSCH.

In a possible implementation, that the third determining module 701 determines a common resource block CRB range of a target resource block RB set includes: determining a CRB range of resource blocks in the target RB set according to a first RB set planning scheme.

In a possible implementation, the third determining module 701 is further configured to, before determining the CRB range of the target RB set according to the first RB set planning scheme, determine the first RB set planning scheme for a carrier according to a nominal intra-cell guard band and an RB set pattern of the carrier.

In another possible implementation, that the third determining module 701 determines a common resource block CRB range of resource blocks in a target resource block RB set includes: in a case that an active UL carrier bandwidth part BWP satisfies a first condition and a second condition, determining the CRB range of resource blocks in the target RB set according to the first RB set planning scheme, where the first condition is that the active UL BWP includes all RBs in an initial UL BWP, and the second condition is that the active UL BWP has the same subcarrier spacing SCS and cyclic prefix CP as the initial UL BWP; or in a case that the active UL BWP does not satisfy the first condition and/or does not satisfy the second condition, determining a CRB range of resource blocks in the target RB set according to a second RB set planning scheme.

In a possible implementation, the third determining module 701 is further configured to: before determining the CRB range of resource blocks in the target RB set according to the second RB set planning scheme, determine the second RB set planning scheme according to an intra-cell guard band configured for the terminal.

The apparatus for receiving a PUSCH signal in this embodiment of this application may be an apparatus, or may be a component, an integrated circuit, or a chip in the network-side device. The apparatus may be a base station. For example, the base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a WLAN access point, a Wi-Fi node, a transmission and reception point (TRP), or another appropriate term in the art. The embodiments of this application do not specifically limit thereto.

The apparatus for receiving a PUSCH signal in this embodiment of this application may be an apparatus having an operating system. The operating system may be an Android operating system, may be an iOS operating system, or may be another possible operating system. This is not specifically limited in the embodiments of this application.

The apparatus for receiving a PUSCH signal provided in this embodiment of this application can implement the processes implemented by the method embodiment in FIG. 6. To avoid repetition, details are not described herein again.

Figure 8:
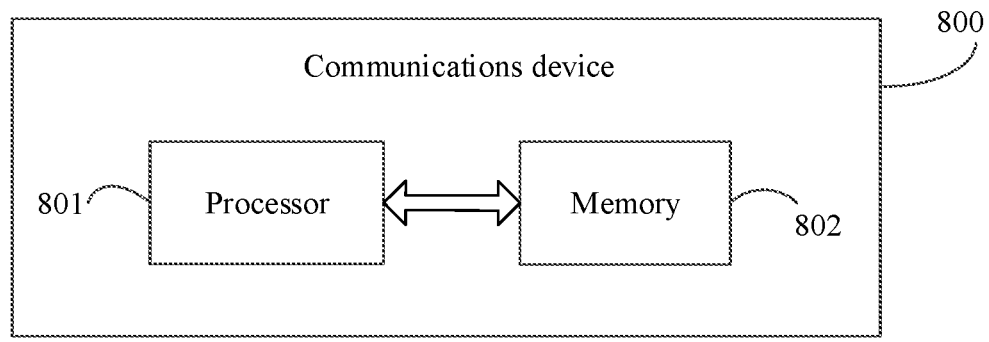
FIG. 8 is a schematic structural diagram of a communications device according to an embodiment of this application.

Optionally, as shown in FIG. 8, an embodiment of this application further provides a communications device 800, including a processor 801, a memory 802, and a program or instructions stored in the memory 802 and capable of running on the processor 801. For example, in a case that the communications device 800 is a terminal, when the program or instructions are executed by the processor 801, the processes implemented by the foregoing embodiment of the method for mapping a PUSCH signal are implemented, with the same technical effects achieved. In a case that the communications device 800 is a network-side device, when the program or instructions are executed by the processor 801, the processes implemented by the foregoing embodiment of the method for receiving a PUSCH signal are implemented, with the same beneficial effects achieved. To avoid repetition, details are not described herein again.

Figure 9:
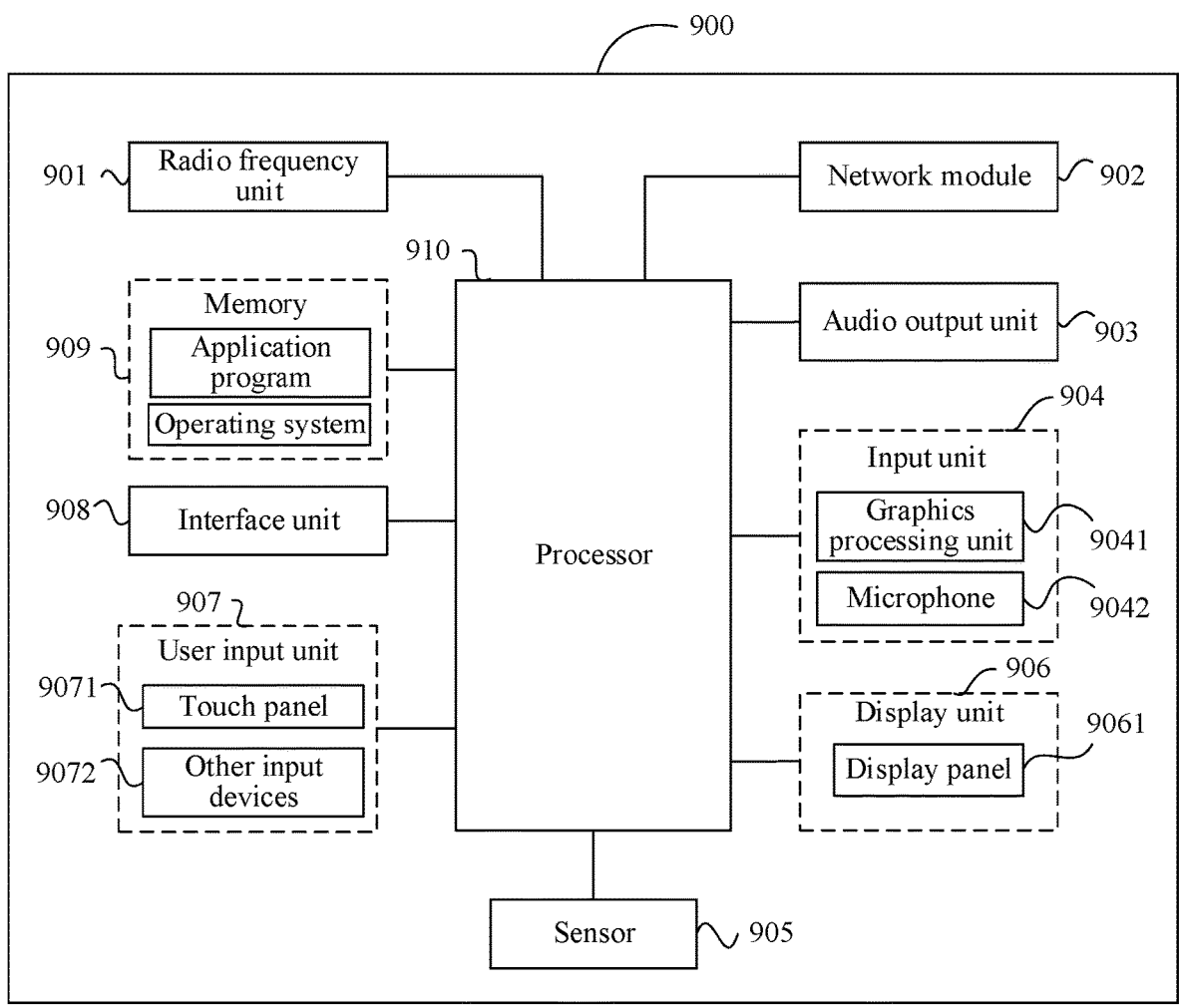
FIG. 9 is a schematic structural diagram of hardware of a terminal according to an embodiment of this application.

FIG. 9 is a schematic diagram of a hardware structure of a terminal for implementing the embodiments of this application.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

It can be understood by those skilled in the art that the terminal 900 may further include the power supply (for example, a battery) supplying power to the components. The power supply may be logically connected to the processor 910 via a power management system, so that functions such as charge and discharge management and power consumption management are implemented via the power management system. The structure of the terminal shown in FIG. 9 does not constitute any limitation on the terminal, and the terminal may include more or fewer components than shown in the diagram, or combine some of the components, or have different arrangements of the components. Details are not described herein.

It should be understood that, in this embodiment of this application, the input unit 904 may include a graphics processing unit (GPU) 9041 and a microphone 9042. The graphics processing unit 9041 processes image data of a static picture or a video that is obtained by an image capture apparatus (for example, a camera) in a video capture mode or an image capture mode. The display unit 906 may include the display panel 9061. The display panel 9061 may be configured in a form of a liquid crystal display, an organic light-emitting diode, or the like. The user input unit 907 includes a touch panel 9071 and other input devices 9072. The touch panel 9071 is also referred to as a touchscreen. The touch panel 9071 may include two parts: a touch detection apparatus and a touch controller. The other input devices 9072 may include but are not limited to a physical keyboard, a function button (for example, a volume control button or a power on/off button), a trackball, a mouse, and a joystick. Details are not described herein.

In this embodiment of this application, the radio frequency unit 901 sends downlink data received from a network-side device to the processor 910 for processing, and in addition, sends uplink data to the network-side device. Generally, the radio frequency unit 901 includes but is not limited to an antenna, at least one amplifier, a transceiver, a coupler, a low noise amplifier, a duplexer, and the like.

The memory 909 may be configured to store software programs or instructions and various data. The memory 909 may mainly include a program or instruction storage area and a data storage area. The program or instruction storage area may store an operating system, an application program or instructions required for at least one function (for example, a sound play function and a first image play function), and the like. Further, the memory 909 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, The memory 909 may be, for example, at least one magnetic disk storage device, flash memory, or other volatile solid-state storage device.

The processor 910 may include one or more processing units. Optionally, the processor 910 may integrate an application processor and a modem processor. The application processor mainly processes an operating system, a user interface, an application program or instructions, and the like. The modem processor mainly processes wireless communication. The processor 910 may be, a baseband processor. It can be understood that the modem processor may alternatively be not integrated in the processor 910.

The processor 910 is configured to execute the following method steps:
determining, according to a frequency domain resource allocation type for the terminal and frequency domain resource allocation information for the terminal, a target resource block allocated to a PUSCH, where the target resource block includes a first target virtual resource block VRB or a first target physical resource block PRB;
determining, according to the frequency domain resource allocation type and/or a scheduling mode of the PUSCH, a mapping mode of mapping a PUSCH signal to a second target PRB, where the second target PRB is the first target PRB or a PRB corresponding to the first target VRB; and
mapping the PUSCH signal to the second target PRB by using the mapping mode.

In the embodiments of this application, a target VRB or target PRB allocated to a PUSCH is determined according to a frequency domain resource allocation type for a terminal and frequency domain resource allocation information for the terminal; a mapping mode of mapping a PUSCH signal to the target PRB is determined; and the PUSCH signal is mapped to the target PRB by using the mapping mode. In this way, the terminal can perform mapping on the PUSCH signal in corresponding modes according to different frequency domain resource allocation types, so that a base station can effectively detect the PUSCH signal sent by the terminal, improving effectiveness of a communications system.

Figure 10:
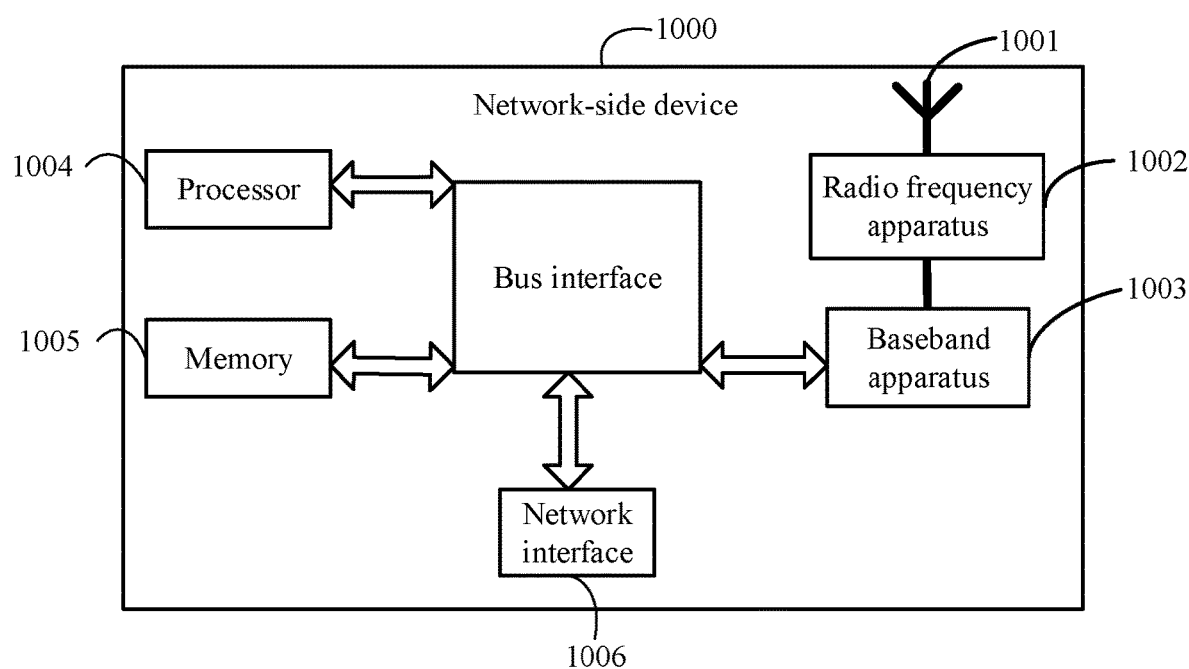
FIG. 10 is a schematic structural diagram of hardware of a network-side device according to an embodiment of this application.

Specifically, an embodiment of this application further provides a network-side device. As shown in FIG. 10, the network-side device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information through the antenna 1001, and transmits the received information to the baseband apparatus 1003 for processing. In a downlink direction, the baseband apparatus 1003 processes to-be-transmitted information, and transmits the information to the radio frequency apparatus 1002; and the radio frequency apparatus 1002 processes the received information and then transmits the information through the antenna 1001.

The band processing apparatus may be located in the baseband apparatus 1003. The method performed by the network-side device in the foregoing embodiment may be implemented by the baseband apparatus 1003, and the baseband apparatus 1003 includes a processor 1004 and a memory 1005.

The baseband apparatus 1003 may include, for example, at least one baseband processing unit, where a plurality of chips are disposed on the baseband processing unit. As shown in FIG. 10, one of the chips is, for example, the processor 1004, and connected to the memory 1005, to invoke the program in the memory 1005 to perform the operations of the network-side device shown in the foregoing embodiment of the method for receiving a PUSCH signal.

The baseband apparatus 1003 may further include a network interface 106, configured to exchange information with the radio frequency apparatus 1002, where the interface is, for example, a common public radio interface (CPRI for short).

Specifically, the network-side device in this embodiment of the present invention further includes a program or instructions stored in the memory 1005 and capable of running on the processor 1004. The processor 1004 invokes the program or instructions in the memory 1005 to execute the methods executed by the modules shown in FIG. 7, with the same technical effect achieved. To avoid repetition, details are not described herein again.

An embodiment of this application further provide a readable storage medium, where the readable storage medium stores a program or instructions, and when the program or instructions are executed by a processor, the processes of the foregoing embodiment of the method for mapping a PUSCH signal or the method for receiving a PUSCH signal are implemented, with the same technical effect achieved. To avoid repetition, details are not described herein again.

The processor is the processor in the terminal described in the foregoing embodiment. The readable storage medium includes a computer-readable storage medium, such as a computer read-only memory (ROM), a random access memory (RAM), a magnetic disk, or an optical disc.

Another embodiment of this application provides a chip. The chip includes a processor and a communications interface, where the communications interface is coupled to the processor, and the processor is configured to run a program or instructions of a network-side device to implement the processes of the foregoing embodiment of the method for receiving a PUSCH signal, or the processor is configured to run a program or instructions of a terminal to implement the processes of the foregoing embodiment of the method for mapping a PUSCH signal, with the same technical effects achieved. To avoid repetition, details are not described herein again.

It should be understood that the chip in the embodiments of this application may also be referred to as a system-level chip, a system chip, a chip system, a system on chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described methods may be performed in an order different from that described, and various steps may be added, omitted, or combined. In addition, features described with reference to some examples may be combined in other examples.

According to the description of the foregoing embodiments, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this application essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to these specific embodiments. The specific embodiments are merely illustrative rather than restrictive. Inspired by this application, persons of ordinary skill in the art may develop many other manners without departing from the principle of this application and the protection scope of the claims, and all such manners fall within the protection scope of this application.

What is claimed is:

1. A method for mapping a physical uplink shared channel (PUSCH) signal, applied to a terminal and comprising:
determining, according to a frequency domain resource allocation type for the terminal and frequency domain resource allocation information for the terminal, a target resource block allocated to a PUSCH, wherein the target resource block comprises a first target virtual resource block (VRB) or a first target physical resource block (PRB);
determining, according to the frequency domain resource allocation type and/or a scheduling mode of the PUSCH, a mapping mode of mapping a PUSCH signal to a second target PRB, wherein the second target PRB is the first target PRB or a PRB corresponding to the first target VRB; and
mapping the PUSCH signal to the second target PRB by using the mapping mode;
wherein the determining, according to the frequency domain resource allocation type and/or a scheduling mode of the PUSCH, a mapping mode of mapping a PUSCH signal to a second target PRB comprises:
determining, according to the frequency domain resource allocation type for the terminal, an index value of a second target VRB allocated to the PUSCH;
multiplying the PUSCH signal by an amplitude scaling factor, and mapping the resulting PUSCH signal to the second target VRB; and
in a case that the PUSCH is scheduled by the RAR UL grant or the PUSCH is scheduled by the preset downlink control information format scrambled by the TC-RNTI, determining, according to whether the terminal is configured to use interlaced PUSCH or whether the terminal is configured with UL resource allocation type 2, a mapping mode of mapping the PUSCH signal from the second target VRB to the second target PRB.

2. The method according to claim 1, wherein the determining, according to a frequency domain resource allocation type for the terminal and frequency domain resource allocation information for the terminal, a target resource block allocated to a PUSCH comprises:

in a case that the frequency domain resource allocation type is UL resource allocation type 2, and that the PUSCH is scheduled by a random access response RAR uplink UL grant or the PUSCH is scheduled by a preset downlink control information format scrambled by a temporary cell radio network temporary identifier TC-RNTI, determining a common resource block (CRB) range of a target resource block (RB) set, wherein the target RB set is an RB set allocated to the PUSCH; and determining, based on the CRB range and the frequency domain resource allocation information, the first target PRB allocated to the PUSCH.

3. The method according to claim 2, wherein the determining a common resource block CRB range of a target resource block RB set comprises:

determining the CRB range of the target RB set according to a first RB set planning scheme.

4. The method according to claim 3, wherein before the determining the CRB range of the target RB set according to a first RB set planning scheme, the method further comprises:

determining the first RB set planning scheme for a carrier according to a nominal intra-cell guard band and an RB set pattern of the carrier.

5. The method according to claim 1, wherein the determining, according to the frequency domain resource allocation type for the terminal, an index value of a second target VRB allocated to the PUSCH comprises:

in a case that the terminal is configured to use interlaced PUSCH or configured with UL resource allocation type 2, determining that the index value of the second target VRB is equal to an index value of the determined first target PRB; or in a case that the terminal is not configured to use interlaced PUSCH or not configured with UL resource allocation type 2, determining that the second target VRB is the first target VRB.

6. The method according to claim 1, wherein the determining, according to whether the terminal is configured to use interlaced PUSCH or whether the terminal is configured with UL resource allocation type 2, a mapping mode of mapping the PUSCH signal from the second target VRB to the second target PRB comprises:

in a case that a first target condition, a second target condition, and a third target condition are all satisfied, mapping the $n^{th}$ second target VRB to the $(n+N_{BWP,0}^{start}-N_{BWP,i}^{start})^{th}$ second target PRB, wherein $N_{BWP,0}^{start}$ is a start CRB index of the initial UL BWP, $N_{BWP,i}^{start}$ is a start CRB index of the active UL BWP, and n is an integer greater than or equal to 0; and in a case that one or more of the first target condition, the second target condition, and the third target condition are not satisfied, mapping the $n^{th}$ second target VRB to the $n^{th}$ second target PRB; wherein the first target condition is that the terminal is not configured to use interlaced PUSCH or not configured with UL resource allocation type 2;

the second target condition is that the active UL BWP comprises all RBs in the initial UL BWP; and the third target condition is that the active UL BWP has the same subcarrier spacing SCS and cyclic prefix CP as the initial UL BWP.

7. The method according to claim 1, wherein the determining a mapping mode of mapping a PUSCH signal to a second target PRB comprises:

in a case that the terminal is configured to use interlaced PUSCH or configured with UL resource allocation type 2, determining the mapping mode to be a second mapping mode, and in other cases, determining the mapping mode to be a first mapping mode, wherein the first mapping mode is mapping a PUSCH signal to a virtual resource block VRB first and then mapping the PUSCH signal from the VRB to a PRB, and the second mapping mode is directly mapping a PUSCH signal to a PRB.

8. The method according to claim 7, wherein the mapping the PUSCH signal to the second target PRB by using the mapping mode comprises:

in a case that the mapping mode is the second mapping mode, multiplying the PUSCH signal by an amplitude scaling factor, and then mapping the resulting PUSCH signal to the determined first target PRB.

9. A method for receiving a PUSCH signal, applied to a network-side device, wherein the method comprises:

determining, according to a frequency domain resource allocation type configured for a terminal and frequency domain resource allocation information indicated to the terminal, a PRB allocated to a PUSCH of the terminal; and receiving, on the PRB, a PUSCH signal transmitted by the terminal;

wherein the frequency domain resource allocation type and the frequency domain resource allocation information are used for the terminal to determine a target resource block allocated to the PUSCH, wherein the target resource block comprises a first target virtual resource block (VRB) or a first target physical resource block (PRB);

wherein the frequency domain resource allocation type and/or a scheduling mode of the PUSCH is used for the terminal to perform the following steps:

determining, according to the frequency domain resource allocation type for the terminal, an index value of a second target VRB allocated to the PUSCH;

multiplying the PUSCH signal by an amplitude scaling factor, and mapping the resulting PUSCH signal to the second target VRB; and in a case that the PUSCH is scheduled by the RAR UL grant or the PUSCH is scheduled by the preset downlink control information format scrambled by the TC-RNTI, determining, according to whether the terminal is configured to use interlaced PUSCH or whether the terminal is configured with UL resource allocation type 2, a mapping mode of mapping the PUSCH signal from the second target VRB to the second target PRB.

10. The method according to claim 9, wherein the determining, according to a frequency domain resource allocation type configured for a terminal and frequency domain resource allocation information indicated to the terminal, a PRB allocated to a PUSCH of the terminal comprises:

in a case that the frequency domain resource allocation type is UL resource allocation type 2, and that the PUSCH is scheduled by an RAR uplink UL grant or the PUSCH is scheduled by a preset downlink control information format scrambled by a TC-RNTI, determining a common resource block (CRB) range of a target resource block (RB) set, wherein the target RB set is an RB set allocated to the PUSCH; and determining, based on the CRB range and the frequency domain resource allocation information, the PRB allocated to the PUSCH.

11. The method according to claim 10, wherein the determining a common resource block CRB range of a target resource block RB set comprises:
  determining a CRB range of resource blocks in the target RB set according to a first RB set planning scheme.

12. The method according to claim 11, wherein before the determining the CRB range of the target RB set according to a first RB set planning scheme, the method further comprises:
  determining the first RB set planning scheme for a carrier according to a nominal intra-cell guard band and an RB set pattern of the carrier.

13. The method according to claim 10, wherein the determining a common resource block CRB range of resource blocks in the target resource block (RB) set comprises:
  in a case that an active UL carrier bandwidth part (BWP) satisfies a first condition and a second condition, determining the CRB range of the resource blocks in the target RB set according to a first RB set planning scheme, wherein the first condition is that the active UL BWP comprises all RBs in an initial UL BWP, and the second condition is that the active UL BWP has the same subcarrier spacing (SCS) and cyclic prefix (CP) as the initial UL BWP; and
  in a case that the active UL BWP does not satisfy the first condition and/or does not satisfy the second condition, determining a CRB range of resource blocks in the target RB set according to a second RB set planning scheme.

14. The method according to claim 13, wherein before the determining a CRB range of resource blocks in the target RB set according to a second RB set planning scheme, the method further comprises:
  determining the second RB set planning scheme according to an intra-cell guard band configured for the terminal.

15. A terminal, comprising a processor, a memory, and a program or instructions stored in the memory and capable of running on the processor, wherein when the program or instructions are executed by the processor, the processor is configured to:
  determine, according to a frequency domain resource allocation type for the terminal and frequency domain resource allocation information for the terminal, a target resource block allocated to a PUSCH, wherein the target resource block comprises a first target virtual resource block (VRB) or a first target physical resource block (PRB);
  determine, according to the frequency domain resource allocation type and/or a scheduling mode of the PUSCH, a mapping mode of mapping a PUSCH signal to a second target PRB, wherein the second target PRB is the first target PRB or a PRB corresponding to the first target VRB; and
  map the PUSCH signal to the second target PRB by using the mapping mode;
  wherein the processor is specifically configured to:
  determine, according to the frequency domain resource allocation type for the terminal, an index value of a second target VRB allocated to the PUSCH;
  multiply the PUSCH signal by an amplitude scaling factor, and map the resulting PUSCH signal to the second target VRB; and
  in a case that the PUSCH is scheduled by the RAR UL grant or the PUSCH is scheduled by the preset downlink control information format scrambled by the TC-RNTI, determine, according to whether the terminal is configured to use interlaced PUSCH or whether the terminal is configured with UL resource allocation type 2, a mapping mode of mapping the PUSCH signal from the second target VRB to the second target PRB.

16. The terminal according to claim 15, wherein the processor is specifically configured to:
  in a case that the frequency domain resource allocation type is UL resource allocation type 2, and that the PUSCH is scheduled by a random access response RAR uplink UL grant or the PUSCH is scheduled by a preset downlink control information format scrambled by a temporary cell radio network temporary identifier TC-RNTI, determine a common resource block (CRB) range of a target resource block RB set, wherein the target RB set is an RB set allocated to the PUSCH; and
  determine, based on the CRB range and the frequency domain resource allocation information, the first target PRB allocated to the PUSCH.

17. The terminal according to claim 16, wherein the processor is specifically configured to:
  determine the CRB range of the target RB set according to a first RB set planning scheme.

18. The terminal according to claim 17, wherein before the determining the CRB range of the target RB set according to a first RB set planning scheme, the processor is configured to:
  determine the first RB set planning scheme for a carrier according to a nominal intra-cell guard band and an RB set pattern of the carrier.

19. The terminal according to claim 15, wherein the processor is specifically configured to:
  in a case that the terminal is configured to use interlaced PUSCH or configured with UL resource allocation type 2, determine that the index value of the second target VRB is equal to an index value of the determined first target PRB; or
  in a case that the terminal is not configured to use interlaced PUSCH or not configured with UL resource allocation type 2, determine that the second target VRB is the first target VRB.

20. The terminal according to claim 15, wherein the processor is specifically configured to:
  in a case that a first target condition, a second target condition, and a third target condition are all satisfied, map the $n^{th}$ second target VRB to the $(n+N_{BWP,0}^{start} - N_{BWP,i}^{start})^{th}$ second target PRB, wherein $N_{BWP,0}^{start}$ is a start CRB index of the initial UL BWP, $N_{BWP,i}^{start}$ is a start CRB index of the active UL BWP, and n is an integer greater than or equal to 0; and
  in a case that one or more of the first target condition, the second target condition, and the third target condition are not satisfied, map the $n^{th}$ second target VRB to the $n^{th}$ second target PRB; wherein
  the first target condition is that the terminal is not configured to use interlaced PUSCH or not configured with UL resource allocation type 2;
  the second target condition is that the active UL BWP comprises all RBs in the initial UL BWP; and
  the third target condition is that the active UL BWP has the same subcarrier spacing SCS and cyclic prefix CP as the initial UL BWP.

* * * * *